United States Patent

Kubo et al.

[15] 3,703,710

[45] Nov. 21, 1972

[54] SEMICONDUCTOR MEMORY

[72] Inventors: Masaharu Kubo; Ryoichi Hori, both of Hachioji; Minoru Nagata, Kodaira, all of Japan

[73] Assignee: Hitachi, Ltd., Tokyo, Japan

[22] Filed: Jan. 4, 1971

[21] Appl. No.: 103,447

[30] Foreign Application Priority Data

Jan. 5, 1970 Japan ........................45/1811

[52] U.S. Cl. .............340/173 FF, 307/238, 307/279, 340/173 AM

[51] Int. Cl. .........................G11c 11/40, H03k 3/286

[58] Field of Search ...340/173 FF, 173 AM, 174 TB; 307/29, 38, 12, 279, 304, 238

[56] References Cited

UNITED STATES PATENTS

| | | | |
|---|---|---|---|
| 3,573,758 | 4/1971 | Henle et al. | 340/173 FF |
| 3,389,383 | 6/1968 | Burke et al. | 340/173 FF |
| 3,529,299 | 9/1970 | Chung et al. | 340/173 FF |
| 3,423,737 | 1/1969 | Harper | 340/173 FF |
| 3,575,617 | 4/1971 | Burns | 340/173 AM |

OTHER PUBLICATIONS

"Nondestructive Readout Memory Cell Using OS Transistors," P. Pleshko, IBM Technical Disclosure Bulletin, Vol. 8 No. 8 Jan. 1966, pp. 1142–1143.

"FET Memory Cell," F. H. Gaensslen et al, IBM Technical Disclosure Bulletin, Vol. 13 No. 7 Dec. 1970, p. 1751.

*Primary Examiner*—Malcolm A. Morrison
*Assistant Examiner*—Jerry Smith
*Attorney*—Craig and Antonelli

[57] ABSTRACT

A semiconductor memory comprising semiconductor elements organized into a plurality of sub-systems individually provided with respective power supply switches each actuated in synchronism with or in response to the select signal to the corresponding sub-system, whereby a predetermined amount of power is supplied only to the selected sub-system while the remaining sub-systems receive no power or just sufficient power to maintain their memory content.

11 Claims, 4 Drawing Figures

INVENTORS

MASAHARU KUBO

RYOICHI HORI

MINORU NAGATA

BY Craig, Antonelli, Stewart & Hill

ATTORNEYS

INVENTORS

MASAHARU KUBO,
RYOICHI HORI
MINORU NAGATA

BY Craig, Antonelli, Stewart & Hill
ATTORNEYS

SEMICONDUCTOR MEMORY

BACKGROUND OF THE INVENTION

1. Field of the Invention

This invention relates to semiconductor memories and, more particularly, to a semiconductor memory comprising a plurality of memory sub-systems each comprising semiconductor elements and provided with a power supply control means.

2. Description of the Prior Art

Semiconductor elements such as transistors and MOS (metal oxide semiconductor) transistors can be used not only in the arithmetic and control units of the computors but also in various memories such as random access type memories (RAM), shift registers (SR) and "read only" memories (ROM) with the advancement of the technique of integrating semiconductor elements into an IC and an LSI. For example, in a ROM using MOS transistors 1,024 to 2,048 bits can be accommodated in one chip. Also, for an SR or an RAM a chip having a capacity of 256 to 512 bits can be fabricated. However, the memory capacity of a computor is usually several to several 10 times as large. Using many chips to increase the memory capacity leads to various problems in the cost of the power source, power consumption and reliability of the system.

SUMMARY OF THE INVENTION

One object of the invention is to provide a semiconductor memory having a large memory capacity and capable of reducing power consumption.

Another object of the invention is to provide a highly reliable semiconductor memory.

A further object of the invention is to provide a semiconductor memory, which comprises semiconductor chips each containing densely integrated semiconductor elements.

A memory construction according to the invention to achieve the above objects comprises a plurality of chips each including many semiconductor elements (hereinafter defined in detail and referred to as memory sub-systems) individually provided with respective power supply switches each actuated in synchronism with or in response to the select signal to select the corresponding sub-system, wherein a predetermined amount of power is supplied only to the selected sub-system while the remaining sub-systems receive no power or just sufficient power to maintain their memory content.

DESCRIPTION OF THE PREFERRED EMBODIMENTS

Figure 1:
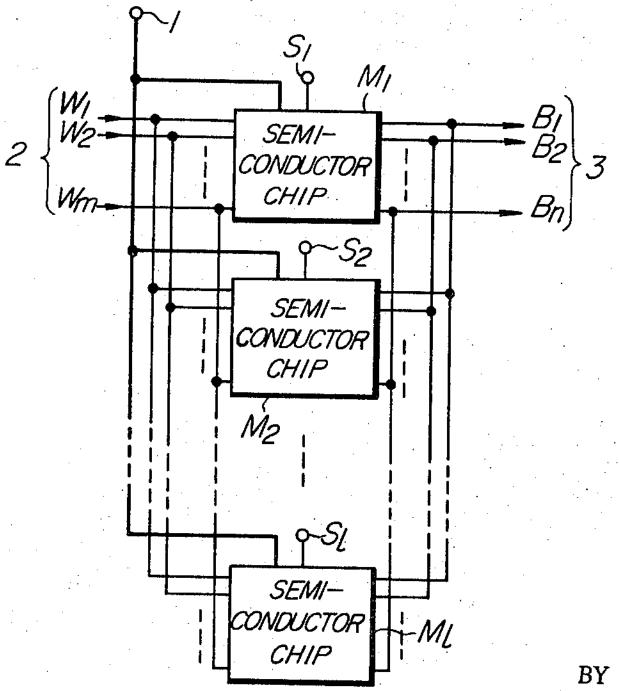
FIG. 1 PRIOR ART
FIG. 1 is a schematic representation of a typical example of the conventional memory system.

FIG. 1 shows a prior-art memory, for instance ROM comprising a plurality of semiconductor chips $M_1, M_2, \ldots, M_l$. A common power supply (not shown) feeds these chips via a feeder line 1. These semiconductor chips $M_1, M_2, \ldots, M_l$ are provided with respective select signal terminals $S_1, S_2, \ldots, S_l$ to receive a select signal. Numeral 2 designates the address input from an address register with m word drive lines $W_1, W_2, \ldots, W_m$ provided to select the required one of $2^m$ addresses (words) in one semiconductor chip. Numeral 3 designates the memory output representing information stored in the selected semiconductor chip and consisting of $n$ bits provided by $n$ bit sense lines $B_1, B_2, \ldots, B_n$. With the construction described above, the memory capacity can be increased by increasing the number of the semiconductor chips even if each chip is capable of accommodating a limited number of bits. In other words, the above construction constitutes an ROM with a memory capacity of $2^m \times l \times n$ bits.

However, if the memory capacity of the above construction is increased, a power supply capable of supplying a greater power is required to feed all the increased number of semiconductor chips. Therefore, the cost of the power supply of the system is increased. Also, as power is always supplied to all the semiconductor chips, each of which has a small heat radiation area and contains many semiconductor elements, the temperature of the chips is extremely raised, tending to result in malfunctioning and thus lowering the reliability of the system. To improve the reliability, the temperature of the chips should be kept low. To this end, however, the number of semiconductor elements accommodated in one chip (the number of integrated elements) should be limited, so that high density of integration cannot be expected.

Figure 2:
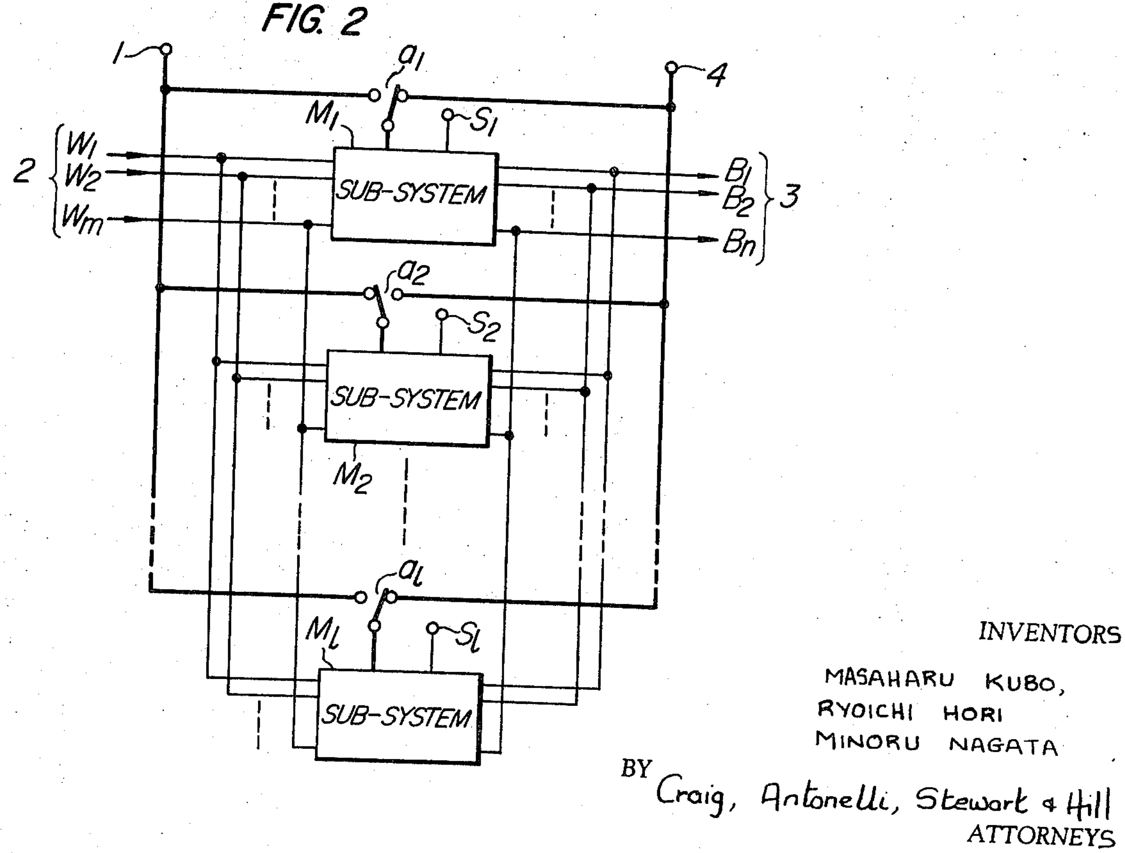
FIG. 2 is a schematic representation of the principal memory construction according to the invention.

FIG. 2 shows one principal memory construction according to the invention, which overcomes the foregoing various drawbacks. In the Figure, the parts like those in FIG. 1 are designated by like reference symbols. In this system, a power supply (not shown) to feed the semiconductor chips $M_1, M_2, \ldots, M_l$ with a power just sufficient to maintain their memory content via a feeder line 4 is provided separately from the power supply connected to the feeder line 1. Each of the semiconductor chips $M_1, M_2, \ldots, M_l$ may constitute a memory sub-system. According to the invention, however, the sub-system is not limited to a single semiconductor chip but may be an appropriate group of semiconductor elements, so it is to be construed herein in this sense. The sub-systems $M_1, M_2, \ldots, M_l$ are switched into connection to either the feeder line 1 or 4 through respective switches $a_1, a_2, \ldots, a_l$, which are actuated in synchronism with or in response to a select signal impressed on the corresponding one of the select signal terminals $S_1, S_2, \ldots, S_l$.

In FIG. 2, the sub-system $M_2$ is shown to be selected, with the drive power supplied through the feeder line 1 only to the sub-system $M_2$ and just sufficient power to maintain the memory state supplied through the feeder line 4 to the remaining sub-systems. For such memories as ROM the feeder line 4 is not necessary. With this construction, a drive power source should be capable of providing a power sufficient to drive only one sub-system, so that the power source may be reduced in size as well as eliminating the afore-mentioned drawbacks in the prior-art memory construction. The switching action described above would be extremely difficult to achieve in case of a memory system using the well-known core memories or wire memories, because in such a system a large current is required for the switching action. It is possible to readily accomplish this only with the semiconductor memory according to the present invention. Particularly, field effect semiconductor elements have pronounced effects in this respect, as will be described later.

Figure 3:
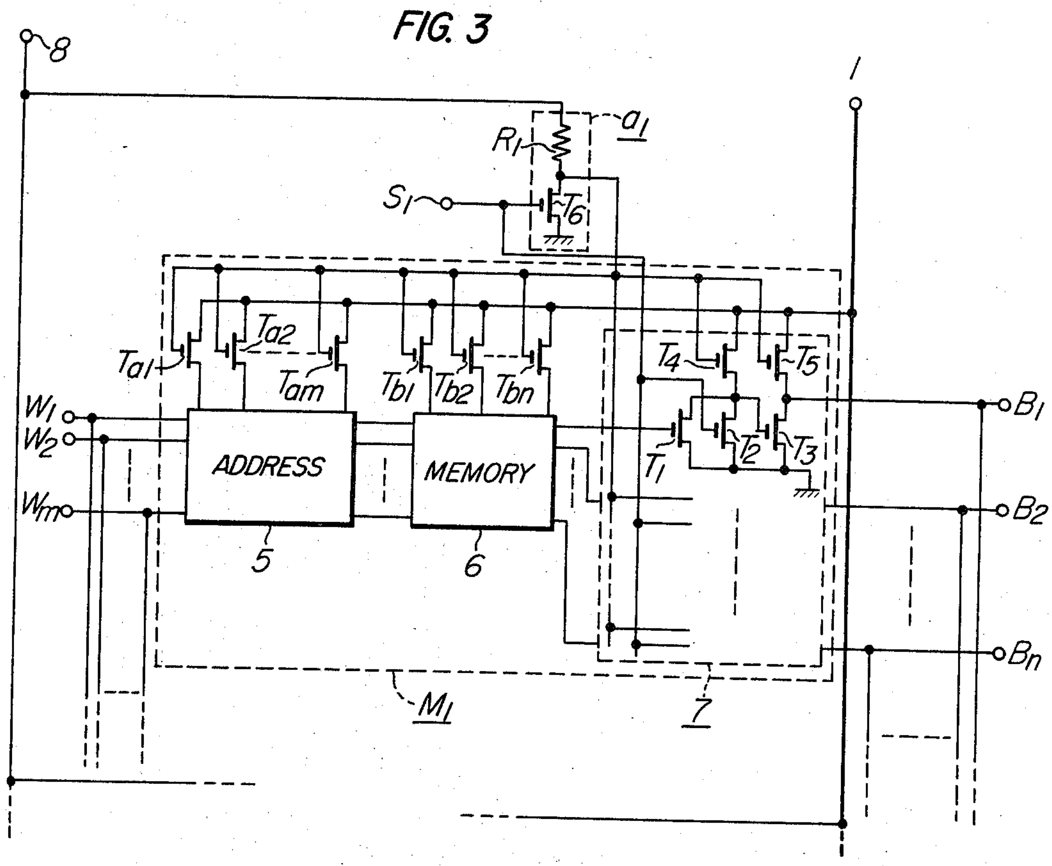
FIGS. 3 and 4 are connection diagrams, partly in block form, showing preferred embodiments of the memory according to the invention.

FIG. 3 shows part of an embodiment of the invention applied to an ROM using MOS transistors. In the Figure, only one sub-system, as generally designated at $M_1$, is shown in detail, and the parts like those in FIG. 2 are designated by like reference symbols. Numeral 5 designates an address section, numeral 6 a memory section, numeral 7 an output section, and numeral 8 a feeder line connected to a switch drive source (not shown). Transistors $Ta_1$, $Ta_2$, . . . , $Ta_m$, $Tb_1$, $Tb_2$, . . . , $Tb_n$, $T_4$ and $T_5$ are equivalent load transistors. They serve to cooperate with change-over switch $a_1$ for the switching of the respective address section 5, memory section 6, and output section 7 with respect to the feeder line 1. Transistors $T_1$ and $T_4$ constitute a two-input NAND gate. One output of the memory section 6 is impressed on the gate of the transistor $T_1$, and a change-over signal is impressed on the gate of the transistor $T_4$. The signal impressed on the select signal terminal $S_1$ controls a transistor $T_2$ such that when the sub-system $M_1$ is not selected, its memory state does not exert any undesired effect on the output signal of any other sub-system, that is, when it is not selected, its output does not appear at output terminal $B_1$. Transistors $T_3$ and $T_5$ constitute a buffer inverter, whose output is available at the bit terminal $B_1$. The change-over switch $a_1$ comprises a resistor $R_1$ and a transistor $T_6$. The address section 5 and the memory section 6 are of well-known constructions and immaterial to the invention, so they are not described in detail.

In the operation of the above construction, when a signal of a level sufficient to cut off the transistor $T_6$ appears at the terminal $S_1$, a predetermined voltage is impressed through the switch source feeder line 8 and the resistor $R_1$ on the gates of the transistors $Ta_1$, $Ta_2$, . . . , $Ta_m$, $Tb_1$, $Tb_2$, . . . , $Tb_n$, $T_4$ and $T_5$ to trigger these transistors. As a result, power is supplied through the feeder line 1 to all the semiconductor elements in the sub-system $M_1$ to render them operative. In this state, specific bit outputs are available at the bit output terminals $B_1$, $B_2$, . . . , $B_n$ in accordance with the address inputs to the address input terminals $W_1$, $W_2$, . . . , $W_m$. In the above construction, the transistors are of the high input impedance type such as MOS transistors, so that only a small current is required to provide the predetermined voltage on the gate of these transistors and a power source capable of providing only a small current is sufficient as the switch drive source connected to the feeder line 8. Particularly, where it is possible to appropriately divide the voltage on the feeder line 1, a single power supply may be commonly used.

The sub-system $M_1$ is rendered inoperative when a signal of a level sufficient to trigger the transistor $T_6$ appears at the terminal $S_1$. At this time, if the internal resistance of the transistor $T_6$ is ignored, the gate potential of the transistors $Ta_1$, $Ta_2$, . . . , $Ta_m$, $Tb_1$, $Tb_2$, . . . , $Tb_n$, $T_4$ and $T_5$ is reduced to ground potential, thus cutting current through the feeder line 1 to the sub-system $M_1$. On the other hand, the transistor $T_2$ is cut off at this time to cut off the transistor $T_3$, so that output of the sub-system $M_1$ disappears irrespective of its memory content.

The sub-system $M_1$ and the switch $a_1$ may be formed integrally in a single semiconductor chip. Also, it is possible to use a transistor in the chip as the resistor $R_1$.

Figure 4:
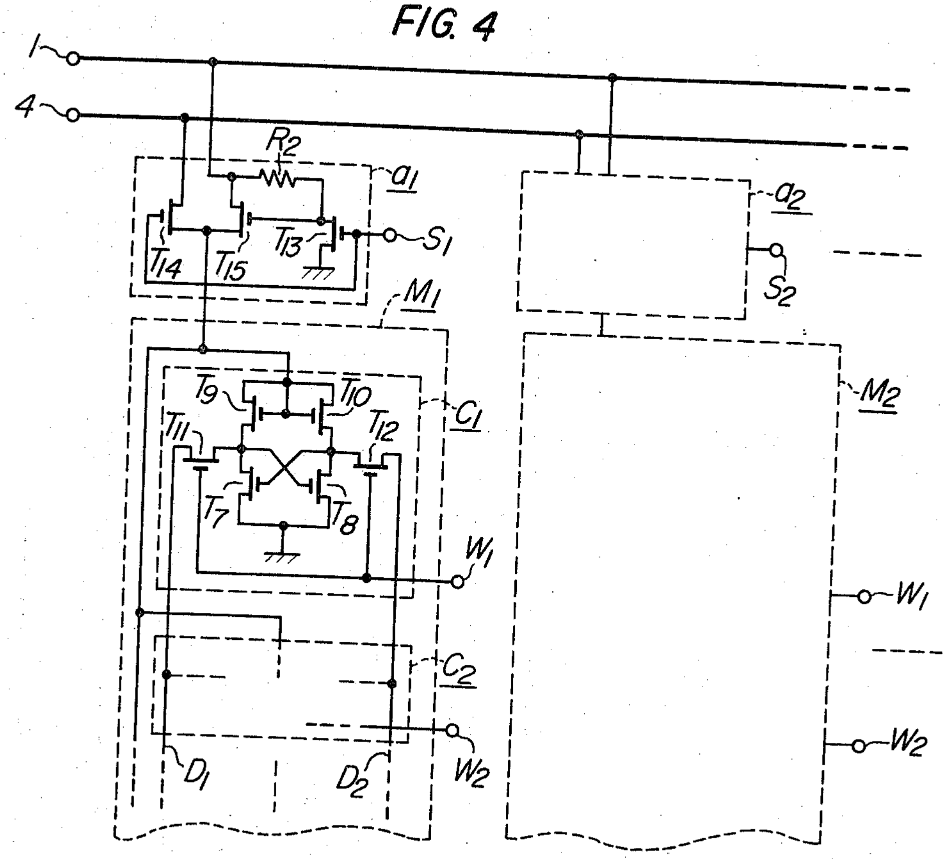

FIG. 4 shows another embodiment of the invention applied to such a memory as an RAM, wherein the memory content clears itself when the power source is completely separated. In the Figure, the parts like those in FIG. 2 are designated by like reference symbols. In this embodiment, the sub-system $M_1$ comprises a plurality of memory cells $C_1$, $C_2$, . . . , each consisting of 6 transistors as a set, for instance MOS transistor $T_7$, $T_8$, $T_9$, $T_{10}$, $T_{11}$ and $T_{12}$ as in the memory cell $C_1$. The writing in these memory cells $C_1$, $C_2$, . . . is accomplished through digit lines $D_1$ and $D_2$ and from the address input terminal $W_1$, $W_2$, . . . . In the read operation, the information stored in the memory cells is taken out through the digit lines $D_1$ and $D_2$ in accordance with the read-out signal impressed on the address input terminals $W_1$, $W_2$, . . . .

The sub-system $M_1$ is switched by the change-over switch $a_1$ into connection to either feeder line 1 or 4. In the switching operation, when a signal of a level sufficient to cut off MOS transistors $T_{13}$ and $T_{14}$ appears at the terminal $S_1$, and MOS transistor $T_{15}$ is triggered. As a result, the drive power is supplied through the feeder line 1 to the sub-system $M_1$. The voltage rating of the source is, for instance, 16 to 24 volts, and the current rating is several to several 10 milliamperes. This is sufficient to ensure the write and read operation of the sub-system $M_1$.

On the other hand, when a signal of a level sufficient to trigger the transistor $T_{13}$ and $T_{14}$ appears at the terminal $S_1$, the transistor $T_{15}$ is cut off to cut power supply via the feeder line 1 and start power supply via the feeder line 4. At this time, it is only necessary to supply power sufficient to maintain the memory state of the memory cells $C_1$, $C_2$, . . . . For example, a power supply with a voltage rating of 9 to 12 volts and a current rating of about 0.1 milliampere is sufficient. Thus the power consumption during the inoperative time can be reduced to about several hundredth of that required during the operative time.

Similar to the previous embodiment, the sub-system $M_1$ and the switch $a_1$ may be formed integrally in an IC or an LSI chip, and it is possible to use an MOS transistor as the load resistor $R_2$. Particularly, it is advantageous to use MOS transistors of a low threshold voltage or depletion type MOS transistors as the transistors $T_{14}$ and $T_{15}$, because of the low voltage drop across them.

Although in the preceding embodiments MOS transistors have been described, they are by no means limitative but other semiconductor elements may as well be used in the memory according to the invention, However, the field effect transistors such as MOS transistors are particularly advantageous in that the switching action can be readily accomplished by changing the voltage level and that less power is required.

As has been described in the foregoing, according to the invention with the semiconductor memory comprising a plurality of memory sub-systems, wherein only the selected sub-system is fed with a predetermined drive power and the remaining syb-systems are supplied with no power or a power only sufficient to maintain the memory state, it is possible to use a power supply capable of providing less power and reduce the power consumption. Also, with the reduction of the power consumption the temperature rise of the sub-systems can be kept small to improve the reliability of the memory and enable high density integration, as well as providing various other practical benefits.

We claim:

1. A semiconductor memory comprising:
a plurality of memory sub-systems each including at least one semiconductor memory section;
common power supply means for supplying drive power to a selected one of said memory sub-systems;
switching means provided to said respective memory sub-systems and actuated with a select signal to select the corresponding one of said memory sub-systems, said switching means including a field effect transistor;
means for connecting said common power supply means to the selected memory sub-system; and
means for supplying the select signal to the respective switching means.

2. A semiconductor memory according to claim 1, wherein said connecting means comprises at least one field effect transistor.

3. A semiconductor memory according to claim 2, wherein said memory section includes a plurality of memory elements and said connecting means comprises a plurality of field effect transistors provided to the respective memory elements.

4. A semiconductor memory according to claim 3, wherein said switching means and connecting means comprise a first field effect transistor having an input terminal and first and second output terminals, a plurality of second field effect transistors provided to the respective memory elements, each of said second field effect transistors having an input terminal and first and second output terminals, a switch source, a resistor connected between said switch source and the second output terminal of said first field effect transistor, means for connecting said select signal supply means to said input terminal of said first field effect transistor, means for connecting the first output terminal of said first field effect transistor to ground, means for connecting the second output terminal of said second field effect transistors to said common power supply means, means for connecting the second output terminal of said first field effect transistor to the input terminals of said second field effect transistors and means for connecting the first output terminals of said second field effect transistors to the respective memory elements.

5. A semiconductor memory comprising:
a plurality of memory sub-systems each including at least one semiconductor memory section;
a first power supply means for supplying drive power to a selected one of said memory sub-systems;
a second power supply means for supplying power sufficient to maintain the memorized state of said semiconductor memory section of non-selected memory sub-systems;
switching means including a field effect transistor and being provided to the respective memory subsystems, said switching means being actuated with a select signal to select the corresponding one of said sub-systems;
means for connecting the selected sub-system to said first power supply means;
means for connecting the non-selected sub-systems to said second power supply means; and
means for supplying the select signal to said switching means.

6. A semiconductor memory according to claim 5, wherein said connecting means include a field effect transistor, respectively.

7. A semiconductor memory according to claim 6, wherein said switching means and connecting means comprise first, second and third field effect transistors each having an input terminal and first and second output terminals, a resistor connected between the second output terminal of said first field effect transistor and the second output terminal of said second field effect transistor, means for connecting the second output terminals of said second and third field effect transistors to said first and second power supply means, respectively, means for connecting the select signal supply means to input terminals of said first and third field effect transistors, means for connecting the second output terminal of said first field effect transistor to the input terminal of said second field effect transistor, means for connecting the first output terminal of said first field effect transistor to ground, and means for connecting the first output terminals of said second and third field effect transistor to the corresponding one of said memory sub-systems.

8. A semiconductor memory comprising:
a plurality of memory sub-systems, each of which includes at least one semiconductor section;
first means, coupled to each of said sub-systems, for supplying driving power to a selected one of said sub-systems;
second means, connected between said first means and said sub-systems, for selectively switching driving power from said first means to one of said memory sub-systems, comprising a transistor switching circuit including first and second transistors connected in series, the first one of which being responsive to a sub-system selection signal for energizing the second transistor, which is connected to said first means, and for controlling the supply of driving power from said first means by way of said second transistor to a selected memory sub-system.

9. A semiconductor memory according to claim 8, wherein said first and second transistors comprise field effect transistors, the series connection therebetween being effected from one of the source and drain electrodes of said first transistor to the gate electrode of said second transistor, said first means being connected to one of the source and drain electrodes of said second field effect transistor, while the other of said source and drain electrodes thereof is connected to a memory sub-system.

10. A semiconductor memory according to claim 9, wherein said second means further includes a control terminal connected to the gate electrode of said first field effect transistor, to which said sub-system selection signal is applied.

11. A semiconductor memory according to claim 10, further including third means, coupled to each of said sub-systems, for supplying power sufficient to maintain the memorized state of the semiconductor memory sections of non-selected memory sub-systems, including an additional transistor switching circuit connected between a memory state maintaining power supply and the electrode of said second field effect transistor which is connected to said sub-system, the control electrode of said additional transistor switching circuit being connected to said control terminal.

* * * * *